J. A. MANAHAN.

CURTAIN FASTENER.

APPLICATION FILED OCT. 26, 1918.

Reissued Dec. 10, 1918.

14,565.

Inventor:
Joseph A. Manahan
by Emery Booth Janney & Varney
Attys

UNITED STATES PATENT OFFICE.

JOSEPH A. MANAHAN, OF NEW YORK, N. Y., ASSIGNOR TO SEYMOUR BOOKMAN, OF NEW YORK, N. Y.

CURTAIN-FASTENER.

14,565. Specification of Reissued Letters Patent. Reissued Dec. 10, 1918.

Original No. 1,208,601, dated December 12, 1916, Serial No. 86,100, filed March 23, 1916. Application for reissue filed October 26, 1918. Serial No. 259,874.

*To all whom it may concern:*

Be it known that I, JOSEPH A. MANAHAN, a citizen of the United States, residing at New York, county of New York, and State of New York, have invented new and useful Improvements in Curtain-Fasteners, of which the following is a specification.

This invention relates to a device for fastening curtains and similar articles to an object which fundamentally comprehends a stud member and an eyelet for engagement with the stud.

The object of the present invention is to equip the eyelet with a spring arranged to project from the opening or loop of the eyelet and adapted to snap into engagement with the shank of the stud.

The invention is designed to obviate accidental disengagement of the eyelet from the stud and it holds the eyelet against axial movement or in fixed relation to the stud. The spring forms a continuous part of the eyelet and the lower portion of said spring extends in a convexed line to coöperate with the shank of the stud.

The novel features of the invention are more fully described in the following specification and claims and illustrated in the accompanying drawing in which:—

In this drawing is shown an eyelet formed of a single sheet of metal having front wall *a*, outer and inner wall *b* and a loop or opening *c* preferably elliptic or oval shaped. The eyelet is hollow or dish shaped as shown and it has an extension or tongue *d* of resilient metal to form a spring with a looped or coiled portion *e* located at the end of the spring. The outer wall *b* of the eyelet has prongs *f* forming integral projections from the wall for fastening the eyelet to a section of material *g* preferably a curtain. A washer *h* is arranged on the back of the curtain opposite to the eyelet and it is held in place by the prongs.

Figure 1:
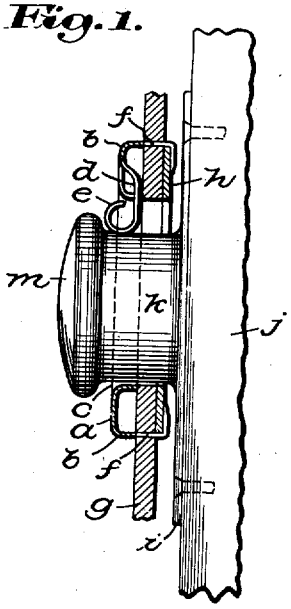
Figure 1 represents a sectional side elevation showing the eyelet snapped onto the stud.

The stud for coöperation with the eyelet is provided with a base or strap *i* for fastening the stud to an object *j* such as the frame of a window or other article. The stud has a shank *k* extending outwardly from the base and it is provided with an elliptical head *m* formed by flanging the shank. In this arrangement the loop of the eyelet when slipped over the head of the stud compresses the spring loop moving it centrifugally away from the axis of the shank until the eyelet slips over the head of the stud as indicated in Fig. 1. In this position the spring loop will move centrifugally or expand to its normal position in close contact with the shank and thus lock the eyelet in place. The spring projects downwardly from the opening and the convolutions of the loop give sufficient resiliency to the spring so that it will snap into positive engagement with the shank of the stud.

Figure 2:
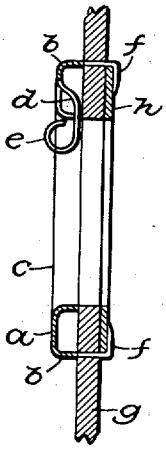
Fig. 2 is a sectional side elevation of the eyelet.
Figure 3:
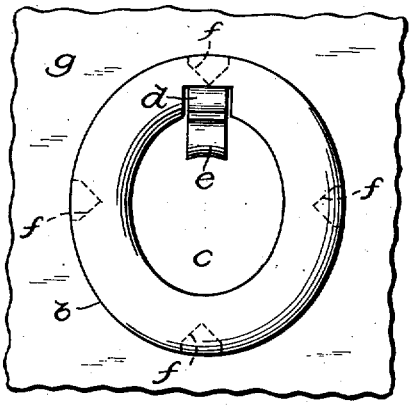
Fig. 3 is a front elevation of Fig. 2.

As indicated in Figs. 1 and 2 the tongue *d* is bent inwardly from the front wall so that the stem or shank of the spring will be positioned against the outer surface of the fabric *g* to support the spring.

Figure 4:
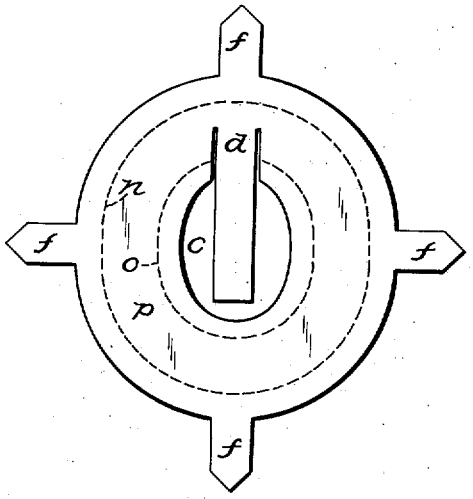
Fig. 4 is a similar view showing the blank.

As shown in Fig. 4 the blank is elliptical and it is adapted to be formed into an eyelet by stamping the blank to the shape indicated in Fig. 1. In this blank the divisions *n* and *o* respectively form the outer and inner walls or rims of the eyelet, while the division *p* will form the front wall of said eyelet. It will be seen that the prongs *f* project from the perimeter of the blank and the tongue *d* for shaping the spring forms an integral extension of the loop or elliptical opening.

In this construction the shank and head of the stud are rigid, but the curtain can be readily disengaged from the stud merely by pulling the lower end of the curtain and drawing the loop over the head.

I claim:—

1. An eyelet comprising a shell including a front having inner and outer walls to form an opening and support the shell on an object, a spring projecting from one of the walls partly into the opening, and a loop located on the spring for coöperation with a stud.

2. An eyelet comprising a shell including a front having inner and outer walls to form an opening and support the shell on an object, a spring projecting from the front wall partly into the opening, and a loop located on the spring for coöperation with a stud.

3. An eyelet comprising a shell including a front having inner and outer elliptical walls to form an opening and support the shell on an object, a spring projecting from the front wall partly into the opening, and a loop formed at the end of the spring for coöperation with the shank of a stud.

4. An eyelet adapted for fastening curtains shaped from a single sheet of metal, comprising a shell including a front dished portion having inner and outer elliptical walls to form an opening and support, prongs extending inwardly from the outer wall for engagement with an object, a spring forming an integral part of the front wall extending partly into the opening, and a loop formed at the end of the spring for coöperation with the shank of a stud.

5. A blank for eyelets comprising an elliptical sheet of metal having an elliptic opening, and a body provided with sections to form an elliptic front with inner and outer wall portions, prongs projecting from the perimeter of the blank, and a resilient tongue forming an integral part of the body.

6. A curtain fastener comprising, in combination, a stud and socket separable by pulling the lower end of the curtain, said stud having an enlarged head, said socket providing resilient jaw means at the top of the opening therein pressing downwardly on the stud behind the head thereof and providing a stud-engaging portion at the bottom of the opening therein for engagement behind the head of the stud, said head of said stud and said stud-engaging portion providing one or more sloping surfaces to permit passage of the bottom of the head of the stud past the said stud-engaging portion of the socket, opposed by resilient pressure of said resilient jaw means.

7. A curtain fastener comprising, in combination, a stud and socket separable by relative tipping movement only, said stud having an enlarged head, said socket providing a resilient transverse jaw at the top of the opening therein pressing downwardly on the stud behind the head thereof and providing at the bottom of the opening therein a part for engagement behind the head of the stud, said stud and said part providing for sloping engagement one with the other to permit passage of the bottom of the head of the stud past the said part, against the pressure of said resilient transverse jaw.

8. A curtain fastener comprising, in combination, a stud and socket separable by relative tipping movement only, said stud having an enlarged head, said socket providing a resilient transverse jaw at the top of the opening therein pressing downwardly on the stud behind the head thereof and providing at the bottom of the opening therein a part for engagement behind the head of the stud, said stud and said part providing for sloping engagement one with the other to permit passage of the bottom of the head of the stud past the said part, against the pressure of said resilient transverse jaw, said socket also providing a stud-engaging surface below said stud, a substantial distance rearwardly of said part.

9. A curtain fastener comprising, in combination, a stud and socket separable by relative tipping movement only, said stud having an enlarged head, said socket providing a resilient transverse jaw at the top of the opening therein pressing downwardly on the stud behind the head thereof and providing at the bottom of the opening therein a part for engagement behind the head of the stud, said stud and said part providing for sloping engagement one with the other to permit passage of the bottom of the head of the stud past the said part, against the pressure of said resilient transverse jaw, said socket also providing a stud-engaging surface below said stud, a substantial distance rearwardly of said part, and providing clearance above said stud opposite said stud-engaging surface, thereby to permit relative tipping movement in one direction only.

In testimony that I claim the foregoing as my own, I have hereto affixed my signature.

JOSEPH A. MANAHAN.